United States Patent [19]

Wallace et al.

[11] 3,951,217

[45] Apr. 20, 1976

[54] IMPACT AIR WRENCH HAVING A TWO POSITION PRESSURE REGULATOR

[75] Inventors: William K. Wallace, Barneveld; Arthur E. Lammens, Whitesboro, both of N.Y.

[73] Assignee: Chicago Pneumatic Tool Company, New York, N.Y.

[22] Filed: Sept. 3, 1974

[21] Appl. No.: 502,545

[52] U.S. Cl. .............................. 173/169; 173/163; 415/503
[51] Int. Cl.² ........................................ B23B 45/04
[58] Field of Search ........... 173/163, 170, 169, 168; 415/503

[56] References Cited
UNITED STATES PATENTS

| | | |
|---|---|---|
| 3,093,360 | 6/1963 | Krouse ............................ 173/169 X |
| 3,354,732 | 11/1967 | Wickham ........................ 173/169 X |
| 3,666,027 | 5/1972 | Sauerwein ........................... 173/169 |
| 3,696,834 | 10/1972 | Vonhoff, Jr. ...................... 173/169 X |
| 3,718,313 | 2/1973 | Miller ............................... 173/169 X |
| 3,833,068 | 9/1974 | Hall ................................. 173/163 X |

Primary Examiner—Ernest R. Purser
Assistant Examiner—William F. Pate, III
Attorney, Agent, or Firm—Stephen J. Rudy

[57] ABSTRACT

A pneumatically powered impact wrench having a two position pressure regulator located in a back cap of the housing between a reverse valve and a reversible air driven motor, the regulator being adapted in a selected first position to cause application of full air pressure to the motor and a consequent full torque to the work in a direction as determined by the reverse valve, and to cause application in a second selected position of reduced air pressure to the motor and a consequent torque of a predetermined lesser value to the motor in an opposite direction.

3 Claims, 9 Drawing Figures

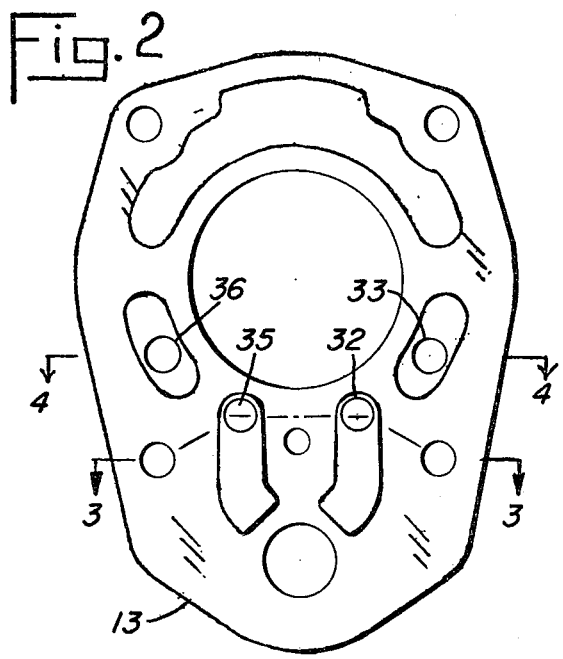
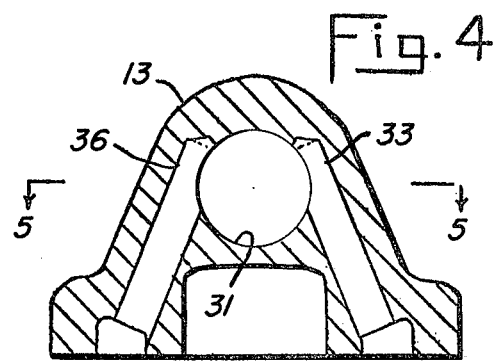
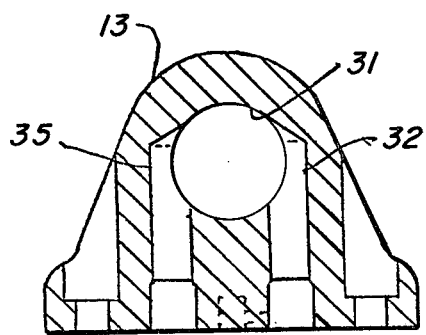
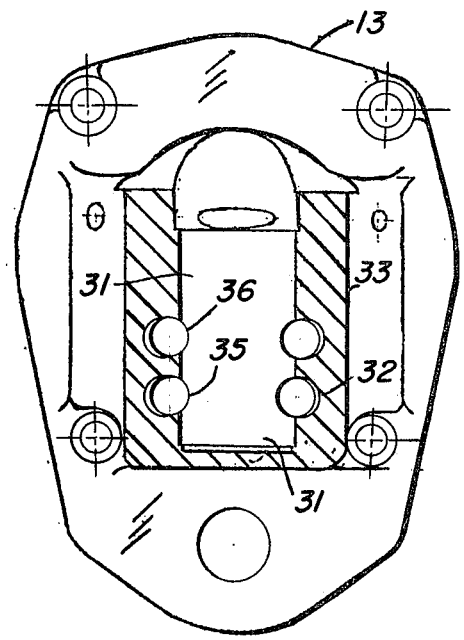

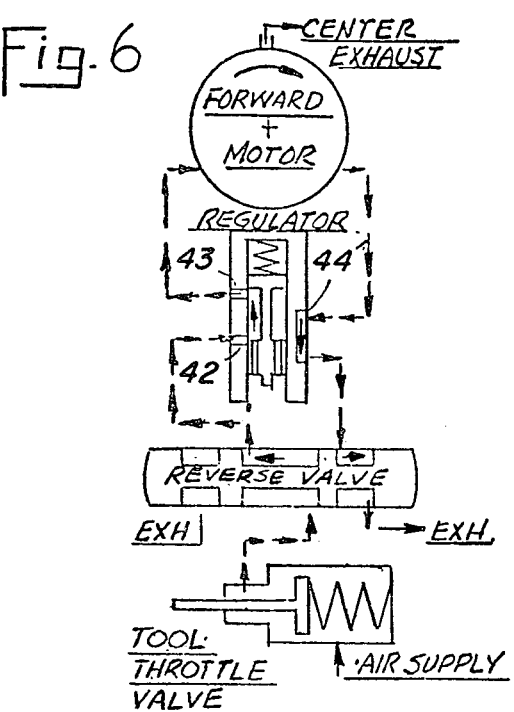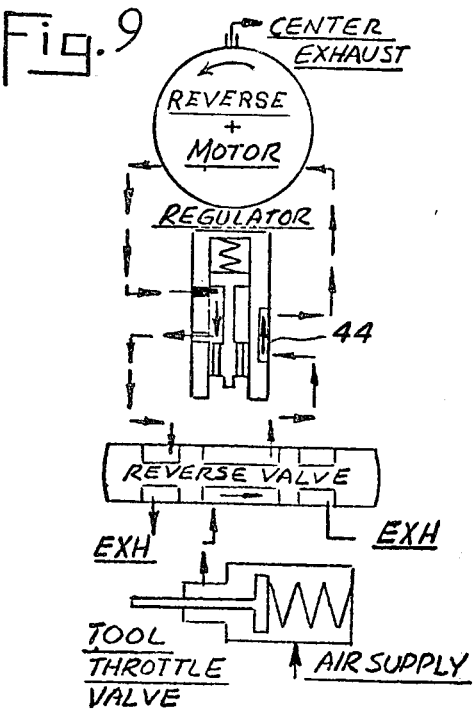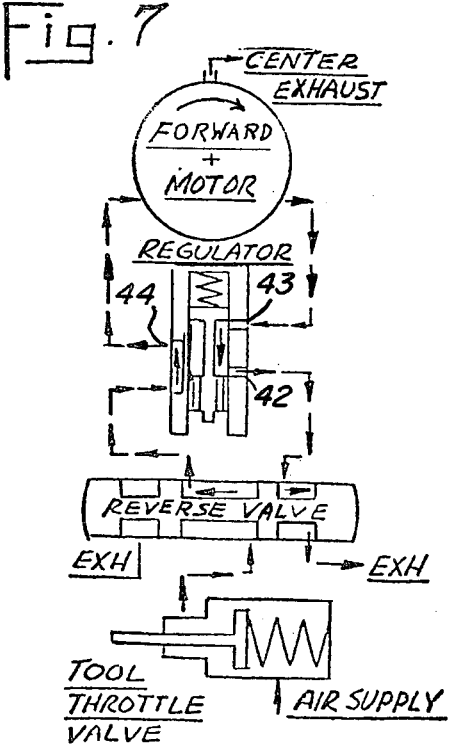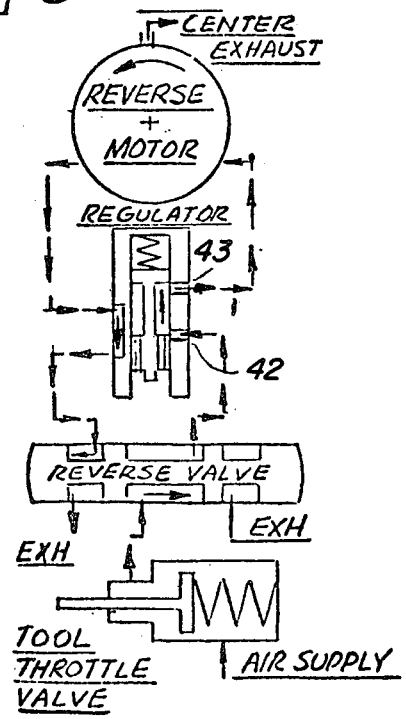

IMPACT AIR WRENCH HAVING A TWO POSITION PRESSURE REGULATOR

BACKGROUND OF THE INVENTION

This invention is concerned with the improvement of a pneumatically driven nut running tool, such as an impact wrench, with directional torque selector mechanism which enables the operator to effect a change in the torque output value of the tool to suit the needs of the intended direction of tool operation.

A tool of this improved nature is especially desirable for wheel work in auto service stations in applying or removing fasteners such as lug bolts or nuts, as well as in other applications.

The full torque capacity of the tool is often required to remove overtightened or frozen lug bolts; whereas a lesser torque is desired to be applied to avoid overtightness and possible damage when installing the bolts. The direction in which this full or lesser torque is to be applied is determined according to whether the particular bolts have right or left hand threads.

The general objective of the present invention is to provide a pneumatically driven nut running tool which enables the operator to select a torque as needed according to the intended direction of operation of the tool for removing or installing a threaded fastener. This selected torque may be either of a predetermined limited value or of full value.

In accordance with the invention, there is provided a pneumatically powered nut running tool comprising an air driven torque transmitting reversible motor, a throttle valve for admitting supply air to the tool to drive the motor, a reversible valve selectively manipulative to guide air from the throttle valve to drive the motor in either a forward or reverse direction; and pressure air regulator means manipulative to a first position for conducting air from the reverse valve at full pressure to the motor, and manipulative to a second position for causing air from the reverse valve to flow at a regulated predetermined reduced pressure to the motor.

BRIEF DESCRIPTION OF DRAWING

In the accompanying drawing:

FIG. 2 is a detail in elevation of the back cap section of the housing exposing the front face of the cap;

FIG. 3 is a section on line 3—3 of FIG. 2;

FIG. 4 is a section on line 4—4 of FIG. 2;

FIG. 5 is a vertical section through the back cap on line 5—5 of FIG. 4;

FIG. 6 is a schematic view showing the supply air flow path to the motor, in which view the reverse valve and pressure regulator have been set for forward drive and application of reduced supply air pressure to transmit limited torque to the work;

FIG. 7 is a schematic view similar to that of FIG. 6, but in which the pressure regulator has been set for application of full supply air pressure and full torque to the work;

FIG. 8 shows the reverse valve and pressure regulator set for application of limited torque to the work in a reverse direction; and FIG. 9 shows the reverse valve and pressure regulator set for application of full torque to the work in a reverse direction.

DESCRIPTION OF PREFERRED EMBODIMENT

Figure 1:
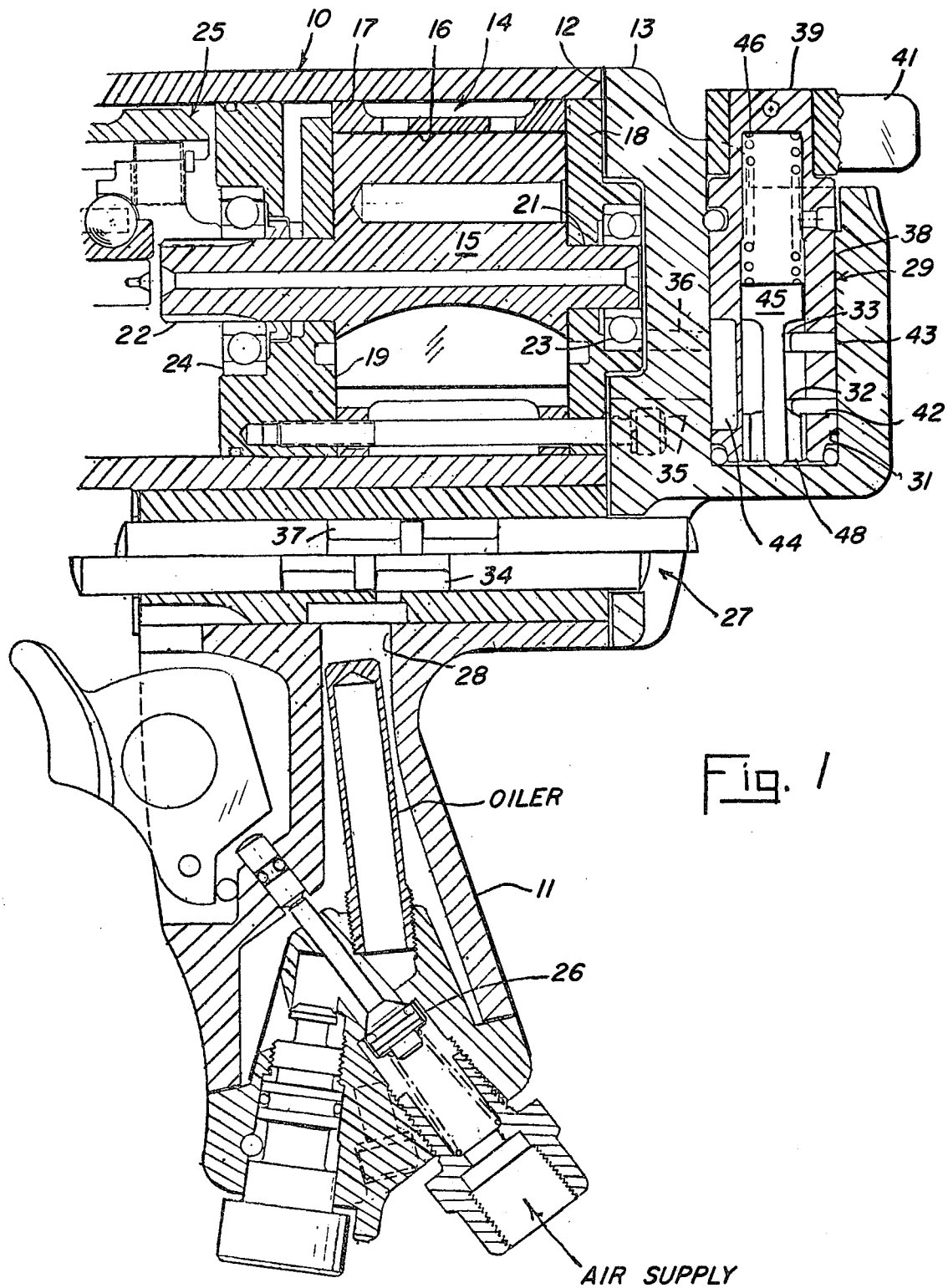
FIG. 1 is a sectional view through a pneumatically powered reversible impact wrench to which the invention has been applied.

Attention is now directed to the drawing wherein the invention is illustrated as embodied in a pneumatically powered nut running tool of the impact wrench type. The tool has a general housing 10 provided with a handle 11. Fitted in the housing adjacent the inner face 12 of a back cap section 13 of the housing is a motor assembly 14 of a conventional reversible air driven vane type.

The motor assembly includes the usual reversible rotor 15 which is rotatable in conventional manner in a chamber 16 in either a forward or reverse direction accordingly as live air is fed to one or the other of the usual directional areas of the motor chamber. Chamber 16 is defined by an openended liner 17, the ends of which are closed by a pair of end plates 18 and 19. The rotor has axially projecting shaft ends 21 and 22 which are respectively supported in bearings 23 and 24.

The rotor shaft end 22 is drivingly coupled with conventional nut driving and impacting mechanism, partially shown at 25, whereby a nut to which the usual socket end of the tool is applied may be set or loosened.

Live air from an external source is caused to be admitted to the tool through a throttle valve 26 under the manual control of the operator. A conventional reverse valve 27, here shown as being of the back-and-forth push type, is arranged in an air feed passage 28 beyond the throttle valve. The reverse valve is adapted to be selectively positioned in conventional manner by the operator to cause flow of inlet air through connecting passages in the housing to either the forward or reverse areas of the motor chamber, as may be required, to drive the motor in a selected direction.

Interconnected in the passages extending from the reverse valve to the motor chamber is a pressure air regulator unit 29 through which air leaving the reverse valve is guided to the motor chamber.

The regulator unit is housed in the back cap section 13 of the housing. To this end, the back cap includes a bore 31 (FIGS. 1, 3–5) having a first pair of side area ports 32 and 33, of which port 32 is an inlet to bore 31 and connects through the peripheral groove passage 34 of the reverse valve with the air feed or supply passage 28 in a first position of the reverse valve (indicated by the lower half of the latter); and of which port 33 is an outlet from bore 31 and connects through housing passages with the forward directional area of the motor chamber. Bore 31 has in opposed relation to the first pair of ports a second pair of ports 35 and 36, of which port 35 is an inlet to bore 31 and connects through the peripheral groove passage 37 of the reverse valve with supply passage 28 in a reverse position of the reverse valve (indicated by the upper half of the valve); and of which port 36 is an outlet from bore 31 and connects through housing passages with the reverse directional area of the motor chamber.

Rotatively disposed in bore 31 is a pressure regulator bushing 38 having an externally projecting stem 39 upon which is secured a manipulative lever 41. The bushing is selectively turnable angularly by means of the lever from a first position to an opposite second position. In the first position, as indicated in FIG. 1, a pair of side area ports 42 and 43 to the interior of the bushing register respectively with the first pair of ports 32 and 33; and a cavity 44 or surface groove in the side area surface of the bushing registers with the second pair of ports 35 and 36. In the second position, the bushing ports 42 and 43 register respectively with the second pair of ports 35 and 36; and the cavity 44 registers with the first pair of ports 32 and 33.

Supply air will be caused to flow around either the cavity 44 or through the bushing ports 42 and 43 to the motor chamber, as determined by the selected position of the regulator bushing. The particular area of the motor chamber, either for forward or reverse directional rotation of the motor to which the supply air will flow, will be determined by the selected position of the reversing valve.

When supply air is directed to the motor around the cavity 44 of the bushing, it will be at the supply or inlet pressure. This is the full or unregulated air pressure. Application of unregulated or full supply air pressure to the motor will cause the tool to apply a full torque to the work. But, when the supply air is directed to the motor through the ports 42 and 43 of the bushing, it will be at a reduced or predetermined regulated pressure. Application of the regulated or less than full supply air pressure to the motor will cause the tool to apply a limited torque to the work.

To obtain the regulated pressure, there is provided in the interior of the bushing a pressure regulating valve 45. The latter is in the form of a slidable spool. It has a normal position under the load of a spring 46 in which the inlet port 42 through the bushing is connected around the neck of the spool valve with the outlet port 43. The valve has ports 48 extending through its lower head which cause the valve to become pneumatically unbalanced by live air entering the bushing. This unbalanced condition provides a differential pressure acting upon the upper head of the valve so as to cause the valve to move upwardly against the force of the spring to restrict the inlet port 42. The resulting restricted supply air flow through inlet port 42 reduces the pressure inside the bushing until the force of the pressure acting on the regulator valve is equal to the force of the spring. Consequently, the pressure of air passing through the outlet port 43 of the bushing to the motor will have a reduced value relative to the supply pressure.

Air spent in driving the motor will exhaust from the motor through the usual exhaust ports. Residual spent air will exhaust back through the opposite area of the regulator bushing and through the usual ports in the reversing valve.

It can be seen that when the regulator bushing has been turned or set to a position for limited torque application and the reverse valve has been set for forward rotation of the motor, as indicated schematically in FIG. 6, air flow from the throttle valve will follow the arrow path through the reverse valve and ports 42, 43 of the pressure regulator to drive the motor with less than the full supply pressure and, consequently, will impart a limited torque to the work.

Should the operator desire that full line pressure be applied to the motor to effect full torque application to the work in a forward direction, the regulator bushing is turned to its other position for application of full line pressure, as indicated in FIG. 7. In this situation, air flow from the throttle and reverse valves will follow the arrow path around the cavity 44 of the regulator bushing to drive the motor in a forward direction with full line pressure and, consequently, will impart full torque to the work.

It can also be seen that, if the operator is applying the tool to work having left hand threads, and desires to apply a limited torque to set the work, he will set the regulator bushing to the position shown in FIG. 8, and will set the reverse valve for reverse rotation. And if he desires to apply a full torque to set the work, he will set the regulator bushing to the position shown in FIG. 9 and will set the reverse valve for reverse rotation.

Further, if the operator wishes to apply full torque to remove an overtightened bolt, he will shift the reverse valve and position the regulator bushing as needed to obtain the proper directional rotation of the motor, according to whether the tightened bolt has a left or right hand thread.

We claim:

1. A pneumatically powered nut running tool comprising an air driven torque transmitting reversible motor, a throttle valve for admitting supply air to the tool to drive the motor, a reversible valve selectively manipulative to guide air from the throttle valve to drive the motor in either a forward or reverse direction; pressure air regulator means manipulative to a first position for conducting air from the reverse valve at full pressure to the motor, and manipulative to a second position for causing air from the reverse valve to flow at a regulated predetermined reduced pressure to the motor; and a cap closing over a back end of the housing of the tool in which cap the regulator means is housed; wherein a bore in the cap has a first inlet port connected with a forward flow groove of the reverse valve and has a first outlet port connected with a forward directional area of the motor; wherein the bore has a second inlet port connected with a reverse flow groove of the reverse valve and has a second outlet port connected with a reverse directional area of the motor; and the regulator means includes an angularly positionable bushing having a surface cavity registrable in a first position of the bushing to communicate the first inlet port with the first outlet port and registrable in a second position of the bushing to communicate the second inlet port with the second outlet port.

2. A pneumatically powered nut running tool as in claim 1, wherein the bushing has a first opening to the interior of the bushing communicating through the interior of the bushing with a first outlet opening, the first inlet opening and first outlet opening being registrable respectively with the said second inlet and outlet ports of the bore in the said first position of the bushing and being registrable respectively with the said first inlet and outlet ports of the bore in the said second position of the bushing; and a pressure regulator valve responsive to air flow through the said inlet opening to the interior of the bushing to restrict the air flow through the inlet opening and as a consequence reduce the pressure of air flow through the said second outlet opening.

3. A pneumatically powered nut running tool as in claim 2, wherein the bushing carries an external manipulative lever for effecting positioning of the bushing from one position to the other.

* * * * *